United States Patent [19]

Tallerico et al.

[11] Patent Number: 4,730,679
[45] Date of Patent: Mar. 15, 1988

[54] GARDEN TOOL WITH HOE PARTS, POINTED NOSE AND ARCHED PROJECTIONS

[76] Inventors: James V. Tallerico; Apolonia Tallerico, both of 2573 N. Woodmere Ridge, LaPorte, Ind. 46350

[21] Appl. No.: 931,195
[22] Filed: Nov. 17, 1986
[51] Int. Cl.$^4$ ................................................ A01B 1/20
[52] U.S. Cl. ..................................... 172/375; 172/378
[58] Field of Search ............... 172/375, 378, 379, 380, 172/381; 56/400.04, 400.05, 400.06, 400.07, 400.21; D8/6, 9, 11, 13

[56] References Cited

U.S. PATENT DOCUMENTS

| D. 125,453 | 2/1941 | Morasco | D8/6 |
|---|---|---|---|
| 531,722 | 1/1895 | Hart | 56/400.21 X |
| 1,798,036 | 3/1931 | Schulz | 172/375 |
| 1,998,195 | 4/1935 | Jenny | 172/380 |
| 2,513,033 | 6/1950 | Linden | 172/375 |
| 2,597,954 | 5/1952 | Schaller | 172/375 |
| 3,181,620 | 5/1965 | Lowery | 172/375 |
| 4,169,509 | 10/1979 | Lawman | 172/375 |

FOREIGN PATENT DOCUMENTS

| 26435 | 8/1920 | Denmark | 56/400.06 |
|---|---|---|---|
| 247931 | 1/1948 | Switzerland | 56/400.06 |
| 116175 | 6/1918 | United Kingdom | 172/375 |

Primary Examiner—Richard T. Stouffer
Attorney, Agent, or Firm—Thomas J. Dodd

[57] ABSTRACT

A garden tool which includes a handle and a connected head part. The head part includes multiple sides each formed into a tool part for performing a specific garden task.

2 Claims, 2 Drawing Figures

GARDEN TOOL WITH HOE PARTS, POINTED NOSE AND ARCHED PROJECTIONS

SUMMARY OF THE INVENTION

This invention relates to a garden tool.

The garden tool of this invention includes an elongated handle and a connected head part. The head part includes multiple side edges configured to perform various garden tasks. The multiple function head part allows the home gardener to perform several different jobs without changing tools and is highly economical.

Accordingly, it is an object of this invention to provide for a novel gardening tool.

Another object of this invention is to provide for a multiple function garden tool which allows an individual to perform several gardening chores without changing tools.

Another object of this invention is to provide for a gardening tool which is durable, versatile and is easy to use.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
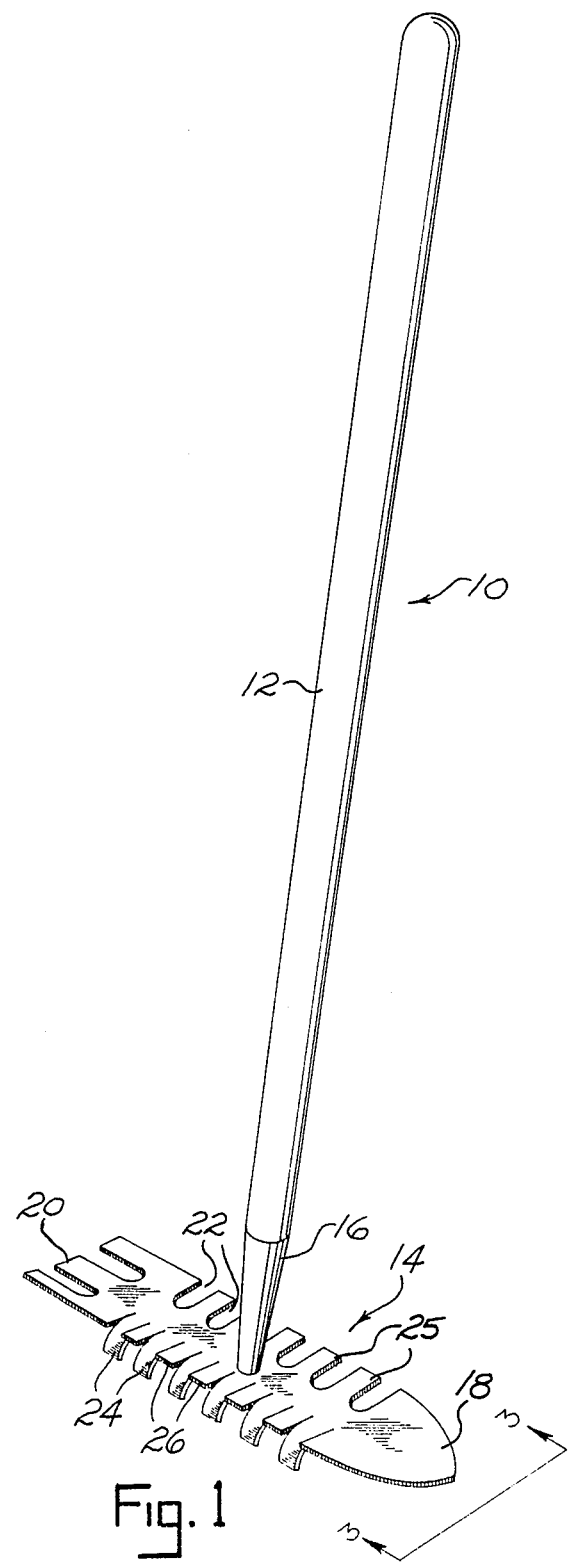
FIG. 1 is a perspective view of the garden tool.
Figure 2:
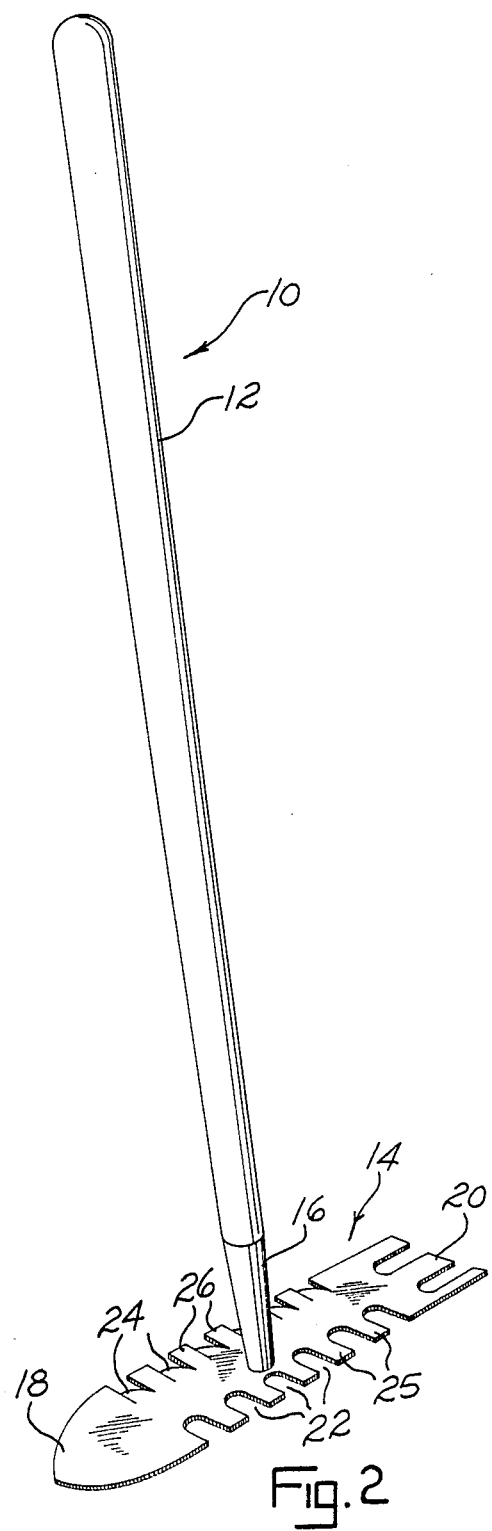
FIG. 2 is a perspective view of the garden tool as seen from the opposite side of the tool from FIG. 1.

Referring now to the drawings, the reference numeral 10 refers generally to the garden tool of this invention. Tool 10 includes an elongated handle 12 formed of wood or similar material. A head part, generally designated by reference numeral 14 is preferably formed of durable rigid material such as metal or metal alloys, and may be of the substantial rectangular shape shown in FIGS. 1 and 2. The shorter end edges of head part 12 are formed into a pointed nose 18 and a slotted hoe 20. One longer side edge of head part 12 includes formed projections 25 which define slots 22 as shown with the opposite side edge of the head part having downturned arched projections 24 formed there along which alternate with flat projections 26. Head part 12 may be bowed from side edge to side edge as seen from line 3—3 of FIG. 1 to facilitate use of nose 18 and hoe 20.

The various side and end edges of tool 10 are designed to perform common gardening tasks. Nose 18 may be used to chop earth and also to form furrows in the soil. Hoe 20 is used to weed areas of the garden with narrow clearance between plants and/or boundary areas. Projections 25 are used as a standard upright hoe in removing weeds and for tilling the soil, while arched projections 24 allow for weed removal by a sweeping motion while the handle is held perpendicular to the ground.

As can be seen, the garden tool 10 of this invention is a highly useful and versatile tool. It is understood that modification may be made to the tool without departing from the spirit of the invention which is in no way limited to the above disclosure, but may be expanded upon in view of the following claim.

I claim:

1. In a garden tool including a handle, and an attached head part for performing gardening tasks, the improvement wherein said head part is substantially four sided having two ends and two sides of longer dimensions than said ends, one of said ends formed into a first slotted hoe part, the other of said ends terminating in a substantially pointed nose, one of said sides formed into a second slotted hoe part, with the other of said sides including arched projections extending from said head part downwardly away from said handle, said arched projections alternating with second projections extending substantially straight outwardly from said head part, said second projection being flat with respect to said head part, such that the free ends of said second projections are spaced from the free ends of said arched projections.

2. The garden tool of claim 1 wherein said second slotted hoe part and said arched projections are integrally formed with said head part.

* * * * *